(12) United States Patent
Hanson (10) Patent No.: US 8,701,552 B2
(45) Date of Patent: Apr. 22, 2014

(54) FORMING DEVICE FOR ARTICLES OF FOOD

(75) Inventor: David Wesley Hanson, Brownstown, MI (US)

(73) Assignee: Wesley Corporation, Rockwood, MI (US)

(*) Notice: Subject to any disclaimer, the term of this patent is extended or adjusted under 35 U.S.C. 154(b) by 679 days.

(21) Appl. No.: 12/608,354

(22) Filed: Oct. 29, 2009

(65) Prior Publication Data

US 2010/0107900 A1 May 6, 2010

Related U.S. Application Data

(60) Provisional application No. 61/197,702, filed on Oct. 30, 2008.

(51) Int. Cl.
*A23P 1/00* (2006.01)
*A22C 7/00* (2006.01)

(52) U.S. Cl.
USPC ............ 99/349; 99/353; 99/439; 99/442; 425/318; 425/416; 425/417; 249/158

(58) Field of Classification Search
USPC ............ 99/349, 353, 428, 432, 439, 442; 425/298, 318, 410, 442, 443, 412, 417, 425/416, 356; 426/513, 512; 249/156, 158, 249/157
See application file for complete search history.

(56) References Cited

U.S. PATENT DOCUMENTS

| | | | | |
|---|---|---|---|---|
| 3,909,881 A | * | 10/1975 | Anderson | 425/116 |
| 5,074,778 A | * | 12/1991 | Betts et al. | 425/394 |
| 5,482,665 A | * | 1/1996 | Gill | 264/113 |
| 5,876,769 A | * | 3/1999 | Dowden et al. | 425/318 |
| 6,990,892 B2 | * | 1/2006 | Errera | 99/388 |

* cited by examiner

*Primary Examiner* — Reginald L Alexander
(74) *Attorney, Agent, or Firm* — The Weintraub Group, P.L.C.

(57) ABSTRACT

The present invention relates to methods and devices for forming articles of food. The methods and devices are configured for forming exterior portions and interior portions of a food article so as to form a cavity for placement of similar or different articles of food therein. In one exemplary embodiment, the present invention provides a forming device configured for forming an exterior portion of the food article in a first step, an interior portion of the food article in a second step and an interior and exterior portion in a third step.

20 Claims, 8 Drawing Sheets

FORMING DEVICE FOR ARTICLES OF FOOD

CROSS-REFERENCE TO RELATED APPLICATION

The present application claims benefit of U.S. Provisional Patent Application No. 61/197,702, filed Oct. 30, 2008, the contents of which are hereby incorporated by reference in its entirety for all purposes.

FIELD OF THE INVENTION

The present invention relates to methods and devices for forming, and more specifically molding, articles of food.

BACKGROUND

Articles of food are often cooked with a bare minimum of molding for shaping an exterior portion of the food. Such molding can include molding through the use of hands. Other molding can be achieved through molded cooking devices configured to mold the food prior or during cooking. Still other molding can be achieved through the use of utensils or devices configured for molding. While these methods and devices have provided some level of molding for articles of food, they are often limited to specific food types due to varying material consistency of the food or customary shape of the food. Also, many of these molds comprise nothing more than receptacles to be used during cooking.

Recently, attention has been generated for creative articles of food that have demonstrated both culinary creativeness, but also, how common everyday foods can be modified to provide improved taste, customized flare, increased nutritional value, or otherwise. For example, this attention has been generated through product infomercials, broadcast television programming and through other means showing how existing food can be improved upon through the device they are demonstrating. However, again, many of these devices shown have been limited in application to certain types or consistency of foods, particularly with respect to mold devices. Furthermore, the vast majority of mold devices are limited to forming exterior portions of food.

In another aspect, it has become continuously desirable to provide individualized articles of food, wherein the articles of food include all the typical ingredients self contained within the individual article of food. This is particularly desirous for expediting delivery of food and reducing potential of inadvertent spillage or mess. One example of an individualized food includes pizza rolls, though many others have been developed. However, there have been few, if any, attempts on improving packaging of a hamburger, which often includes many subsequently placed toppings. For example, with respect to hamburgers, ingredients or toppings commonly placed on exterior portions of hamburgers include mustard, ketchup, mayonnaise, onions, pickles, cheese, lettuce, tomatoes, spices or otherwise. As can be appreciated, with more than a couple of toppings the hamburger becomes difficult to consume. Inevitably, particularly with younger individuals, this leads to inadvertent spillage of the food on hands, clothing, tables or otherwise.

In view of the foregoing, there is a need for improved methods and devices for forming articles of food. More specifically, in one aspect, there is a need for an improved forming device for molding interior and exterior portions of food to form cavities therein for receiving additional food components so as to form an individualized packaged food article, particularly with respect to hamburgers.

SUMMARY OF THE INVENTION

The present invention provides methods and devices for molding articles of food. In one aspect, a forming device for forming food articles is provided. The forming device is configured for not only shaping exterior portions of food, but also interior portions of the food article. In doing so, in one embodiment, the forming device is configured for forming a cavity for placement of additional ingredients into the resulting food article. Such additional ingredients may include any ingredient capable of fitting within the cavity formed by the device. In one exemplary application, the forming device is particularly suited for forming hamburgers having a cavity formed therein for receiving one or more food articles commonly associated with a hamburger. After cooking, the hamburger is simply placed between two opposing buns and consumed without necessary additional fixings, ingredients, toppings or otherwise.

In view of the foregoing, in one exemplary embodiment, the present invention provides a forming device for articles of food. The forming device includes a shell assembly extending between a first end and a second end. The shell assembly includes a first shell member disposed at the first end of the shell assembly. The first shell member has an annular wall with an inner circumference and an inwardly extending lip. The shell assembly also includes a second shell member disposed at the second end of the shell assembly. The second shell member has an annular wall with an inner circumference and an inwardly extending lip. The forming device further includes a base member disposed proximate to the second end. Also, the forming device includes a press assembly moveable between the first end and second end of the shell assembly. The press assembly includes a first press mechanism having an outer circumference and an inner circumference. The outer circumference of the first press mechanism corresponds generally to the inner circumference of the first or second shell member. The press assembly also includes a second press mechanism having an outer circumference generally corresponding to the inner circumference of the first press mechanism. When the press assembly is in a first position, the first and second press mechanism are engaged with one another and are moveable between the first and second end of the shell assembly. When the press assembly is in a second position, the second press mechanism is moveable independent of the first press mechanism between the first and second end of the shell assembly.

In another exemplary embodiment, the present invention provides a forming device for articles of food. The forming device includes a shell assembly extending between a first end and a second end. The shell assembly includes a first shell member disposed at the first end. The first shell member has an annular wall with an inner circumference and a inwardly extending lip. The shell assembly also includes a second shell member disposed at the second end. The second shell member has an annular wall with an inner circumference and an inwardly extending lip. The shell assembly further includes a base member disposed proximate to the second end of the shell assembly. The base member is supported by the inwardly extending lip of the second shell member. The shell assembly still further includes a hinge rotatably connecting the first shell member to the second shell member. The hinge is configured to allow rotation of the first shell member with respect to the second shell member to allow the forming device to move between an open position and a closed position for receiving articles of food. The forming device further includes a press assembly moveable between the first end and second end of the shell assembly. The press assembly includes a first press mechanism having an outer circumference and an inner circumference. The outer circumference of the first press mechanism corresponds generally to the inner circumference of the first and second shell member. The press assembly also includes a second press mechanism having an outer circumference generally corresponding to the inner circumference of the first press mechanism. The press assembly further includes a handle having two opposing engagement features for selective engagement with the first press mechanism and the second press mechanism. The handle is configured to cause movement of the first and second press mechanism between the first end and second end of the shell assembly. In a first position, the engagement features are engaged with the first and second press mechanisms and the first and second press mechanisms are moveable between the first and second end of the shell assembly. In a second position, the engagement features are engaged with only the second press mechanism and the second press mechanism is moveable between the first and second end of the shell assembly and independent of the first press mechanism. In a third position, the engagement features are engaged with the first and second press mechanisms and the first and second press mechanisms are substantially prevented from moving between the first and second end of the shell assembly.

The above-described and other features and advantages of the present invention will be appreciated and understood by those skilled in the art from the following detailed description, drawings, and appended claims.

BRIEF DESCRIPTION OF THE DRAWINGS

Other objects, features, advantages and details of the present invention appear, by way of example only, in the following detailed description of preferred embodiments of the invention, the detailed description referring to the drawings in which.

DESCRIPTION OF THE PREFERRED EMBODIMENTS

The present invention relates to methods and devices for forming articles of food. The methods and devices are configured for forming exterior portions and interior portions of a food article so as to form a cavity for placement of similar or different articles of food therein. In one exemplary embodiment, the present invention provides a forming device configured. The forming device is configured to form an exterior portion of the food article in a first step, an interior portion of the food article in a second step and an interior and exterior portion in a third step.

The forming device is suited for forming articles, particularly food articles, having cavities for receiving similar or different food articles. In one application, the forming device is particularly suited for forming hamburgers. In this configuration, the forming device is configured for forming a lower layer having a recessed portion for placement of any ingredient desired within a hamburger, such as condiments, pickles, onions, cheese, spices, tomatoes, lettuce, other vegetables, meats, or otherwise. The forming device is further configured for forming an upper layer and pressing the upper layer and lower layer together to form a unitary hamburger structure having a cavity. As such, the forming device provides the ability to form a multi-layered stuffed hamburger, wherein, the added ingredients are sealed within the hamburger until consumed.

Figures 1, 3:
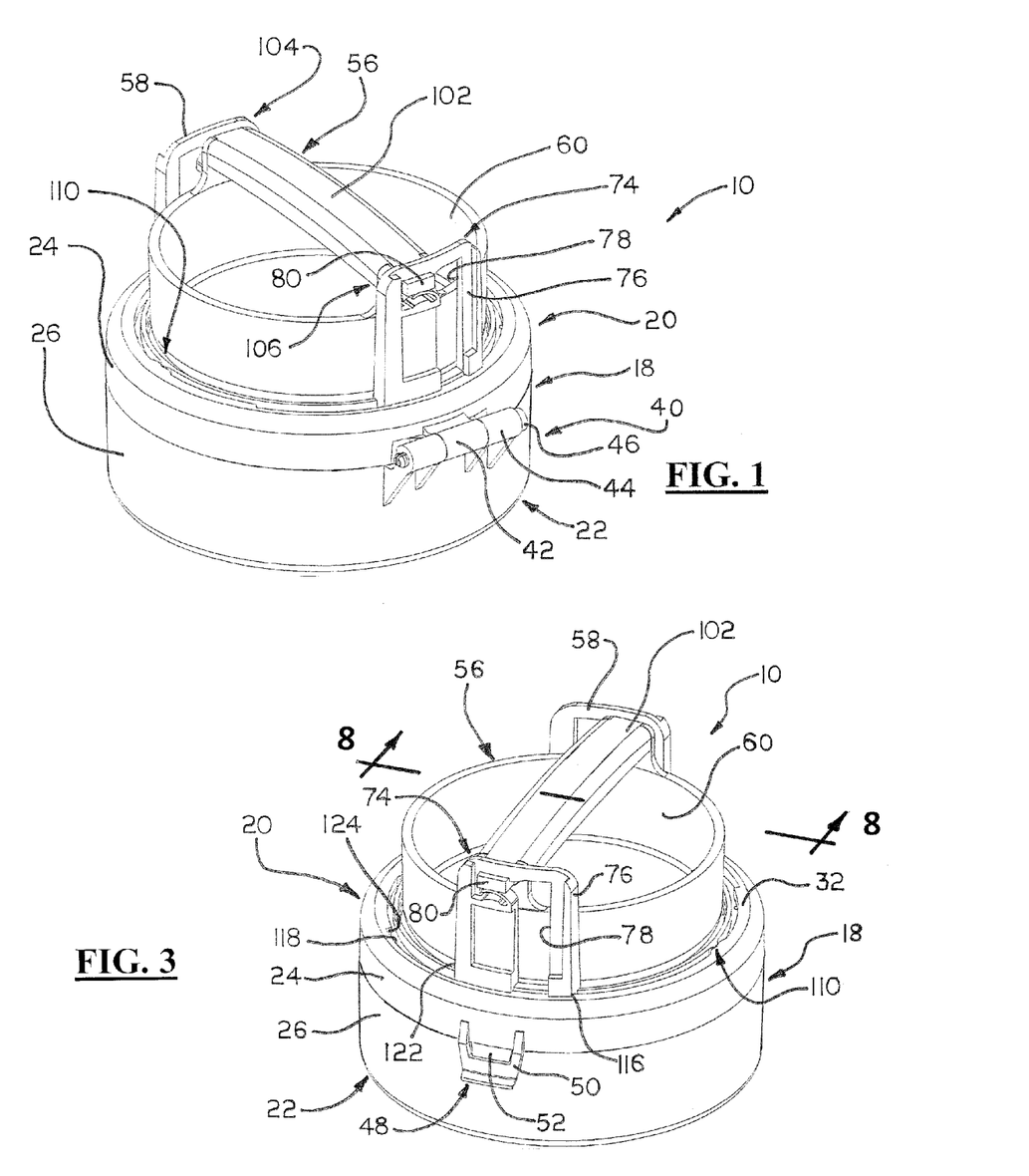
FIG. 1 illustrates a perspective view of an exemplary forming device for articles of food according to the teachings of the present invention.
FIG. 3 illustrates a perspective view of the forming device shown in FIG. 1 in a first position.
Figure 2:
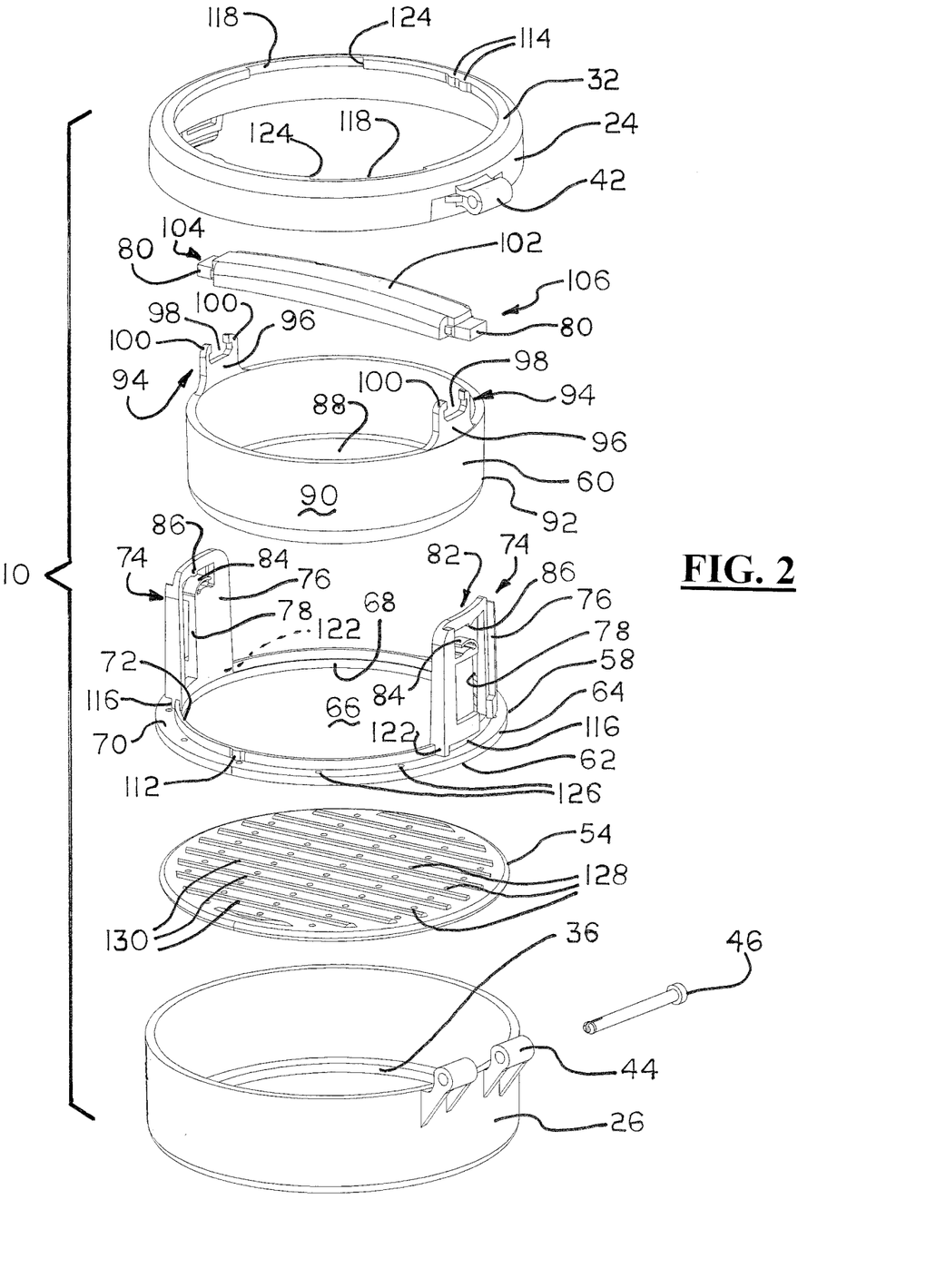
FIG. 2 illustrates an exploded perspective view of the forming device shown in FIG. 1.
Figure 13:
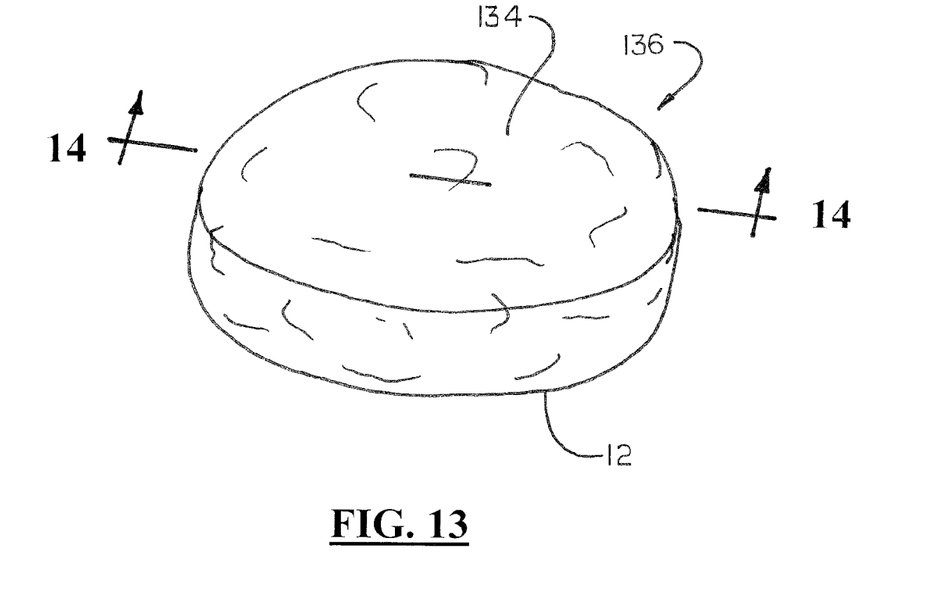
FIG. 13 illustrates a perspective view of a formed food article according to the teachings of the present invention.
Figure 14:
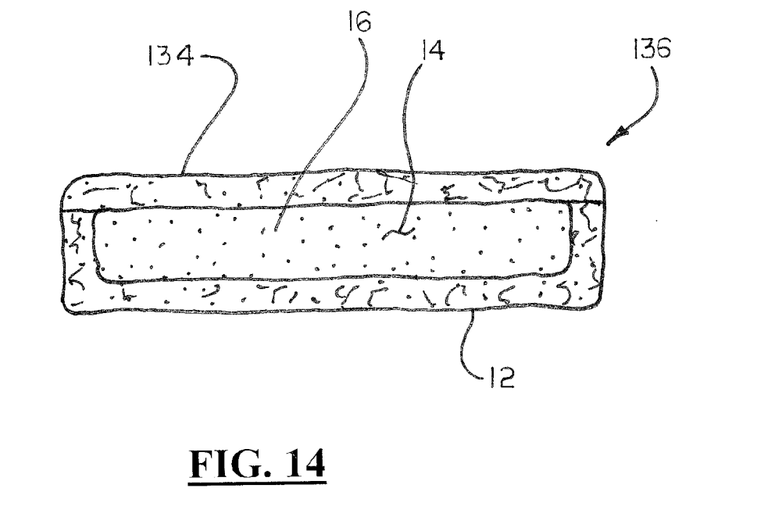
FIG. 14 illustrates a cross-sectional view of the formed food article shown in FIG. 13.

Referring to FIGS. 1 and 2, an exemplary embodiment of a forming device 10 of the present invention is shown. The forming device 10 is configured for forming articles, particularly food articles 12, having a cavity 14 formed therein, for receiving one or more additional food articles 16, as shown in FIGS. 13 and 14. The forming device 10 includes a shell 18 extending between a first end 20 and a second end 22. The shell 18 is configured to move between an open position and a closed position. In one embodiment, the shell 18 includes a first shell member 24 and a second shell member 26. The first shell member 24 includes an annular wall 28 defining an inner circumference 30 and an inwardly extending lip 32 disposed at the first end 20 of the shell 18. The second shell member 26 also includes an annular wall 34 defining an inner circumference 36 and inwardly extending lip 38 disposed at the second end 22 of the shell 18. It should be appreciated that the annular walls 28, 34 may be circular, oval, square, rectangular, triangular or may comprise any other suitable or desired shape.

The first and second shell members 24, 26 are attached together through a hinge 40 comprising a first hinge member 42 associated with the first shell member 26 and a second hinge member 44 associated with the second shell member 26. The first and second hinge members 42, 44 are rotatably attached to one another through a pin 46. The shell further includes a latch 48 for maintaining the first and second shell members 24, 26 together during the closed position of the shell 18. The latch 48 includes a first latch member 50 associated with the first shell member 24 and a second latch member 52 associated with the second shell member 26. The first and second latch members 50, 52 form a snap-fitting.

The forming device 10 further includes a base 54 disposed at the second end 22 of the shell 18 to provide support to the food article 12. In one embodiment, the base 54 is supported by the inwardly extending lip 38 of the second shell member 26. However, in another embodiment it is contemplated that the base 54 may be integrally formed with the second shell member 26.

The forming device 10 further includes a press assembly 56 moveable between the first end 20 and the second end 22 of the shell 18 and rotatably moveable with respect to the shell 18. The press assembly 56 includes a first press mechanism 58 and a second press mechanism 60. The first and second press mechanisms 58, 60 are configured to move between the first and second end 22, 24 of the shell 18 either in unison or independently depending on the position of the press assembly 56. The first and second press mechanisms 58, 60 are further configured for rotatable movement in unison with respect to the shell 18.

The first press mechanism 58 includes a base 62 defining an outer circumference 64 generally corresponding to the inner circumferences 30, 36 of the first and second shell members 24, 26, respectively. In one embodiment, a seal is formed between the outer circumference 64 of the first press mechanism 58 and the inner circumference 30, 36 of annular walls 28, 34 of the first and second shell members 24, 26. Accordingly, in one embodiment, it is contemplated that an elastic seal member is disposed between the second press mechanism 60 and the first and/or second shell member 24, 26.

The base 62 of the first press mechanism 58 forms an opening 66 defined by an inner circumference 68. In the configuration shown, the base 62 is formed of a first outwardly extending ring 70 and a second upwardly extending ring 72, which is generally perpendicular to the outwardly extending ring 70. The first press mechanism 58 further includes an engagement feature 74 for engagement with the second press mechanism 60. In the embodiment shown, the engagement feature is formed on two opposing extensions 76 extending generally perpendicular with respect to the outwardly extending ring 70. The engagement feature 74 includes a slot 78 extending generally perpendicular with respect to the outwardly extending ring 70. The slots 78 are configured for receiving engagement members 80. In this configuration, the slots 78 extend generally vertical from a first end of the extensions 76 and perpendicular at a second end of the extensions 76, with respect to base 62. The engagement feature 78 includes locking features 82 disposed with each engagement feature 74 for maintaining the position of the engagement member 80 with respect to the first press mechanism 58. In the configuration shown, the locking feature 82 comprises a resilient member 84 and a tab 86 disposed along the perpendicular portion of slot 78.

The second press mechanism 60 includes a base 88 and a vertically extending annular wall 90 having an outer circumference 92 corresponding generally to the inner circumference 68 of the first press mechanism 58 to allow the second press mechanism to move within the opening 66 formed by the first press mechanism 58. It should be appreciated, as with the annular walls 28, 34 of the first and second shell members 20, 22, that the annular wall 90 of the second press mechanism 60 and inner circumference 68 of the first press mechanism 58 may be circular, oval, square, rectangular, triangular or may comprise any other suitable or desired shape. Also, a seal may be formed or provided between annular wall 90 of the second press mechanism 60 and the inner circumference 68 of the first press mechanism 58. The second press mechanism 60 includes two opposing engagement features 94 for engagement with the first press mechanism 58 and more specifically, engagement members 80. In the embodiment shown, the engagement features 94 are formed on two opposing extensions 96 extending from the base 88 and annular wall 90. Each engagement feature 94 includes a recessed portion 98 configured for receiving the engagement members 80. The engagement feature 94 of the second press mechanism 60 further includes a two opposing tabs 100 for releasable engagement with the engagement member 80.

The forming device 10 further includes a handle 102 for causing movement of the first press mechanism 58 and the second press mechanism 60. In one configuration, a first end 104 and a second end 106 of the handle 102 includes engagement members 80 for engagement with the first and second press mechanisms 58, 60. In one exemplary embodiment, the forming device further includes a post extending between the handle 102 and second press mechanism 60, or other device or member, for increasing rigidity of the handle and/or forming device.

Figure 8:
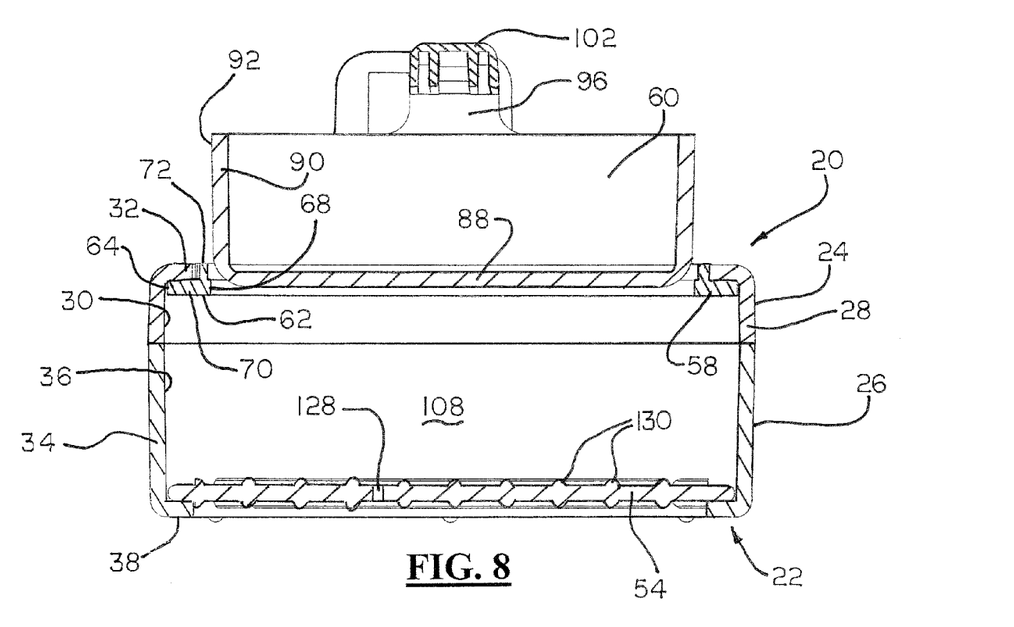
FIG. 8 illustrates a cross-sectional view of the forming device taken along line 8-8 of FIG. 3.

The forming device 10 is configured for movement between multiple positions for forming a food article 12, as described herein. In a first position, referring to FIGS. 3 and 8, the forming device 10 is in an initial position and configured to move between an open and a closed position for receiving a food article 12 into a cavity 108 formed by the second shell member 26. In this position, the press assembly 56 is rotated, counterclockwise, into a lock position, which resists further rotational movement of the press assembly 56. The lock position is achieved through a rotational lock mechanism 110 formed between the first press mechanism 58 and the inwardly extending lip 32 of the first shell member 24. More specifically, the lock mechanism 110 comprises a first tab 112 formed on the press assembly 56 and disposed between two adjacently located tabs 114 formed on the inwardly extending lip 32 of the first shell member 24. In this position, the press assembly 56 is further prevented from movement between the first and second ends of the shell 18 by an engagement between the inwardly extending lip 32 of the first shell member 24 and a groove 116 formed in the extension 76 of the first press mechanism 58. The engagement of the inwardly extending lip 32 and groove 116 provides rotational guidance of the press assembly 56 about the shell 18.

In a second position, the forming device 10, shown in FIG. 3, is opened to expose the cavity 108 formed by the second shell member. This is achieved by unlatching latch 48 to allow the first shell member 24 to move, along with the press assembly 56, with respect to the second shell member 26, via hinge 40. Once opened, a food article 12, such as a hamburger, the like or otherwise, is placed in cavity 108, which is supported by the second shell member 24, via base 54. After placement of the food article 12, the forming device 10 is closed, via the hinge 40, and locked, via the latch 48.

Figure 4:
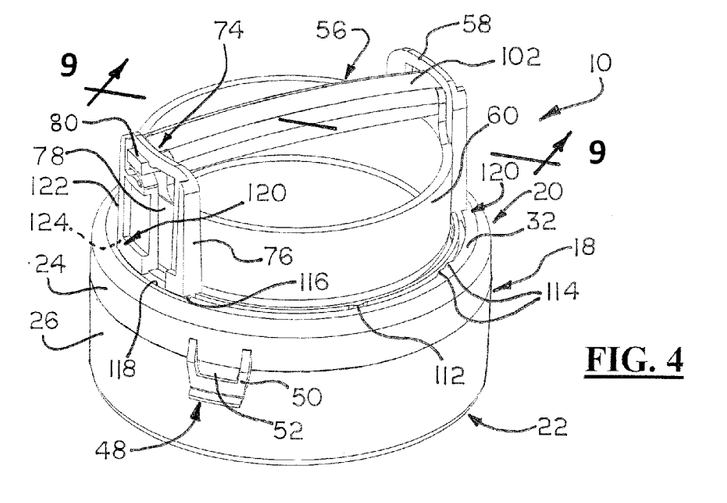
FIG. 4 illustrates a perspective view of the forming device shown in FIG. 1 in a second position.
Figure 9:
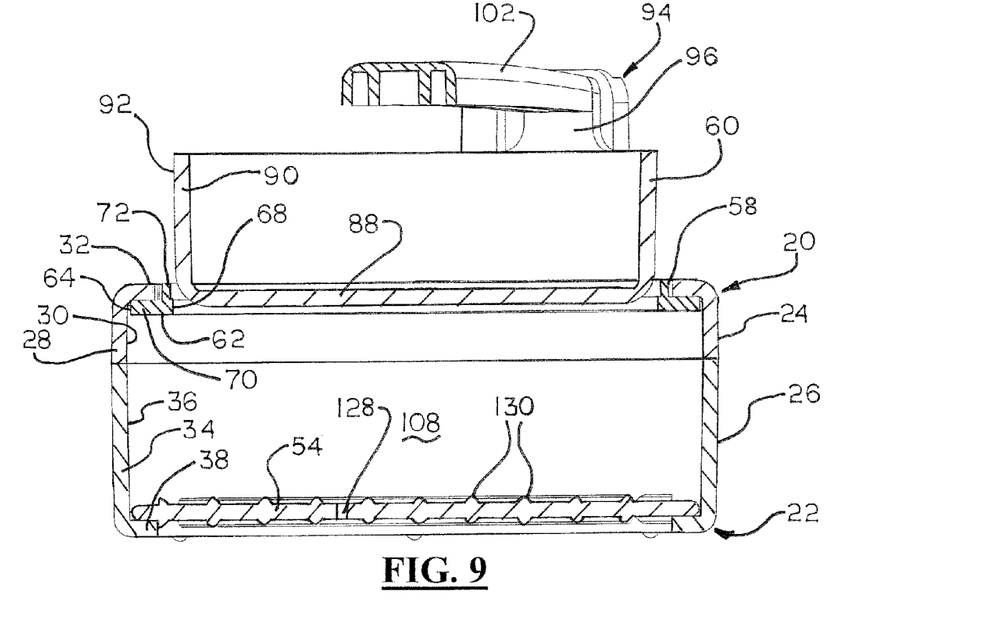
FIG. 9 illustrates a cross-sectional view of the forming device taken along line 9-9 of FIG. 4.

In a third position, referring to FIGS. 4 and 9, the press assembly 56 is rotated into a compress position to compress the food article 12 within cavity 108. In this position, the press assembly 56 is rotated clockwise, which is guided by groove 116 and inwardly extending lip 32, until the extensions 76 of the first press mechanism 58 are aligned with slots or openings 118 formed through the inwardly extending lip 32. Rotation stops 120 are formed by edges 122 of extensions 76 and edges 124 forming openings 118, which also provide alignment of extensions 76 with openings 118. In the third position, due to opening 118, groove 116 is no longer engaged with inwardly extending lip 32, which allows movement of the press assembly 56 between the first and second ends 20, 22 of the shell 18.

Figure 5:
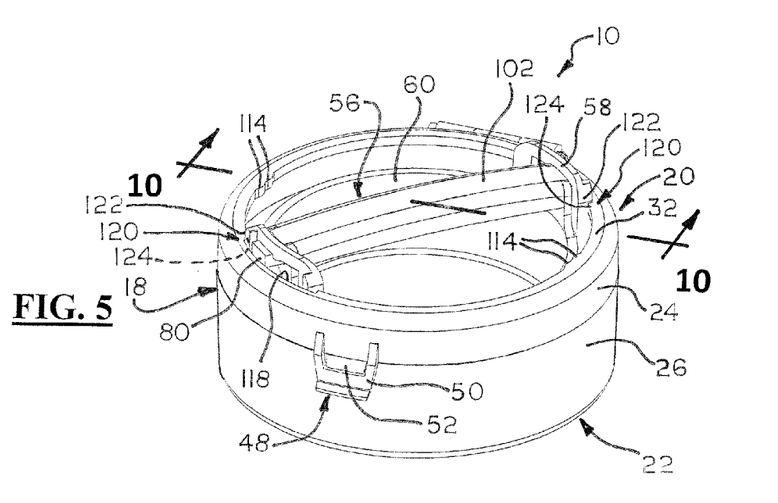
FIG. 5 illustrates a perspective view of the forming device shown in FIG. 1 in a third position.
Figure 10:
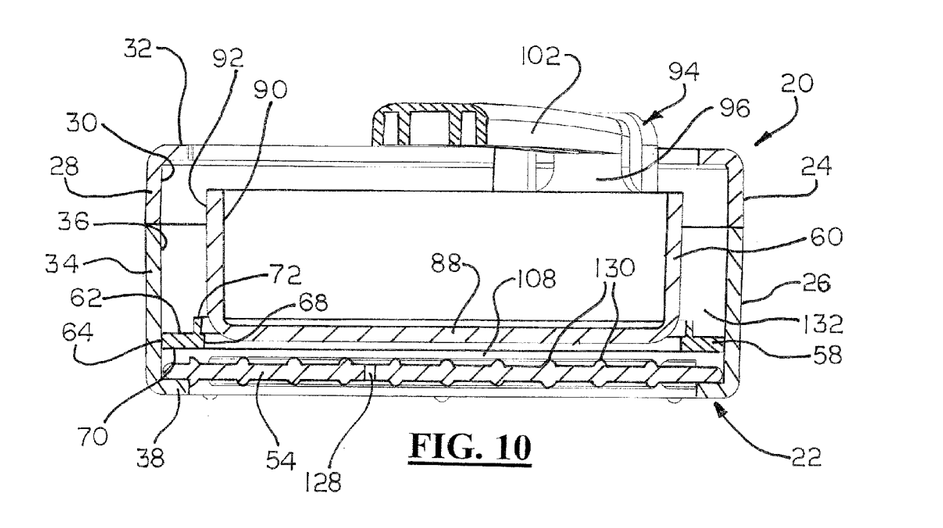
FIG. 10 illustrates a cross-sectional view of the forming device taken along line 10-10 of FIG. 5.

In a fourth position, referring to FIGS. 5 and 10, the press assembly 56, including the first and second press mechanism 58, 60, are lowered to the second end 22 of shell 18 to compress the food article 12 within cavity 108. The amount of movement of the press assembly 56 is dependent upon the volume of food article 12 placed within cavity 108. During movement of the press assembly 56, the base 62 of the first press mechanism 58 and the base 88 of the second press mechanism 60 compress the food article 12 against base 62. During compression, inner circumference 36 of the second shell member 26 shapes an outer circumference of the food article 12 to form a cylindrical shaped food article 12. It should be appreciated that the distance between base 62 of the first press mechanism 58 and base 62 will vary based upon the volume of food article 12 with cavity 108.

In one configuration, the base 62 of the first press mechanism 58 includes a plurality of openings 126 for facilitating in airflow therethrough during movement towards and away from second end 22 of the shell 18. Similarly, in one configuration, base 54 also includes a plurality of openings 128 for facilitating airflow therethrough, during movement of the press assembly 56 between the first and second end of the shell 18. Advantageously, the airflow provides improved compression and separation of the forming device 10 with the food article 12. Optionally, the base 62 includes a plurality of ribs 130 or other contour features for providing unique contours to an exterior surface of the food article 12, such as grill marks or otherwise. Additionally, the base 88 of the second press mechanism 60 may also include ribs or other contour features. Similarly, base 88 may also include a plurality of openings for airflow therethrough.

Figure 6:
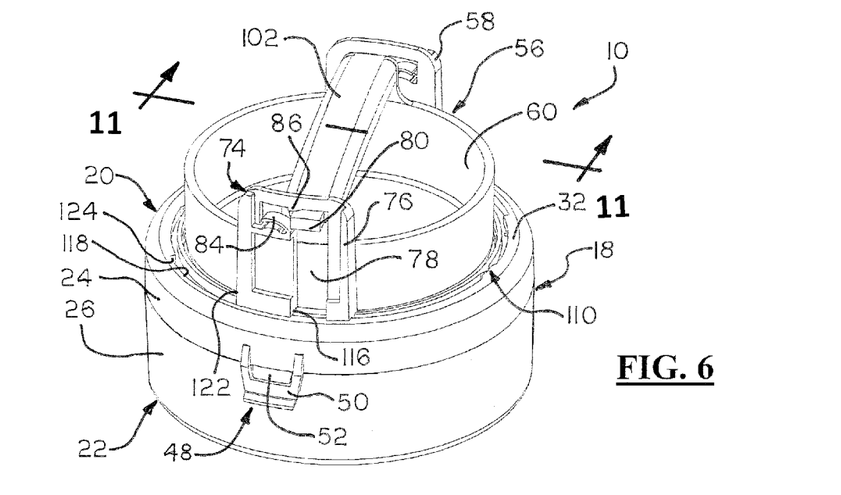
FIG. 6 illustrates a perspective view of the forming device shown in FIG. 1 in a fourth position.
Figure 11:
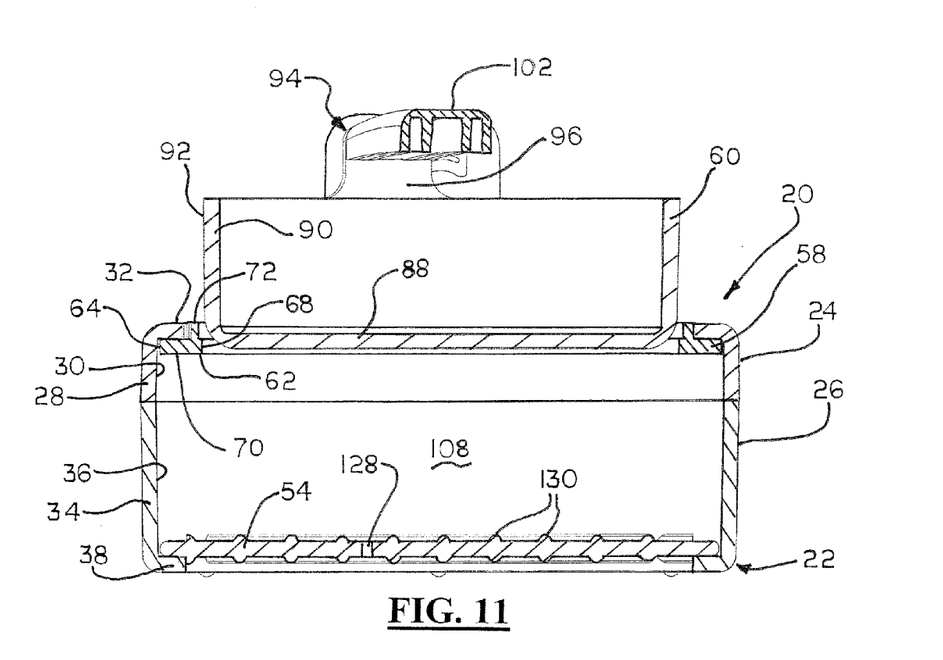
FIG. 11 illustrates a cross-sectional view of the forming device taken along line 11-11 of FIG. 6.

In a fifth position, referring to FIGS. 6 and 11, the press assembly 56 is again disposed towards the first end of shell 18 and rotated counter-clockwise to a similar position shown in FIG. 3. However, in this position the engagement member 80 is disengaged with the first press mechanism 58, but maintains engagement with the second press mechanism 60. This disengagement of the engagement member 80 with the first press mechanism 58 allows for movement of the second press mechanism 60 between the first and second ends 20, 22 of the shell 18 that is independent from the first press mechanism 58.

Figure 7:
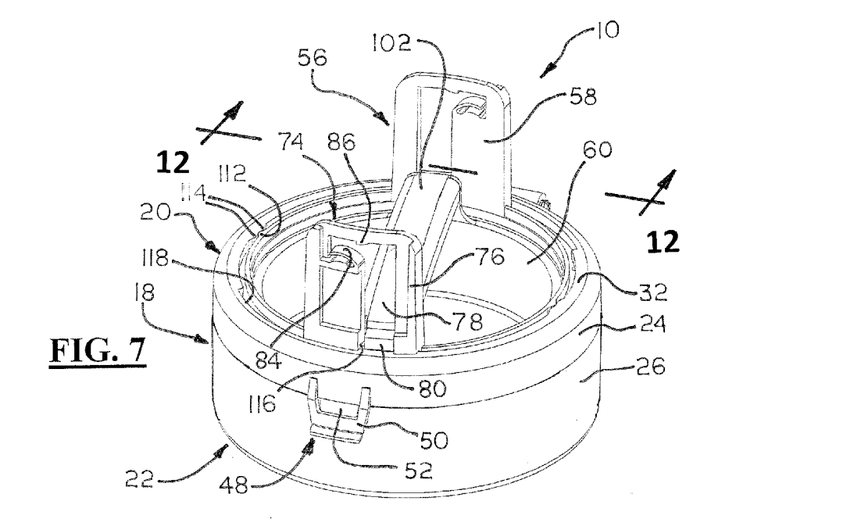
FIG. 7 illustrates a perspective view of the forming device shown in FIG. 1 in a fifth position.
Figure 12:
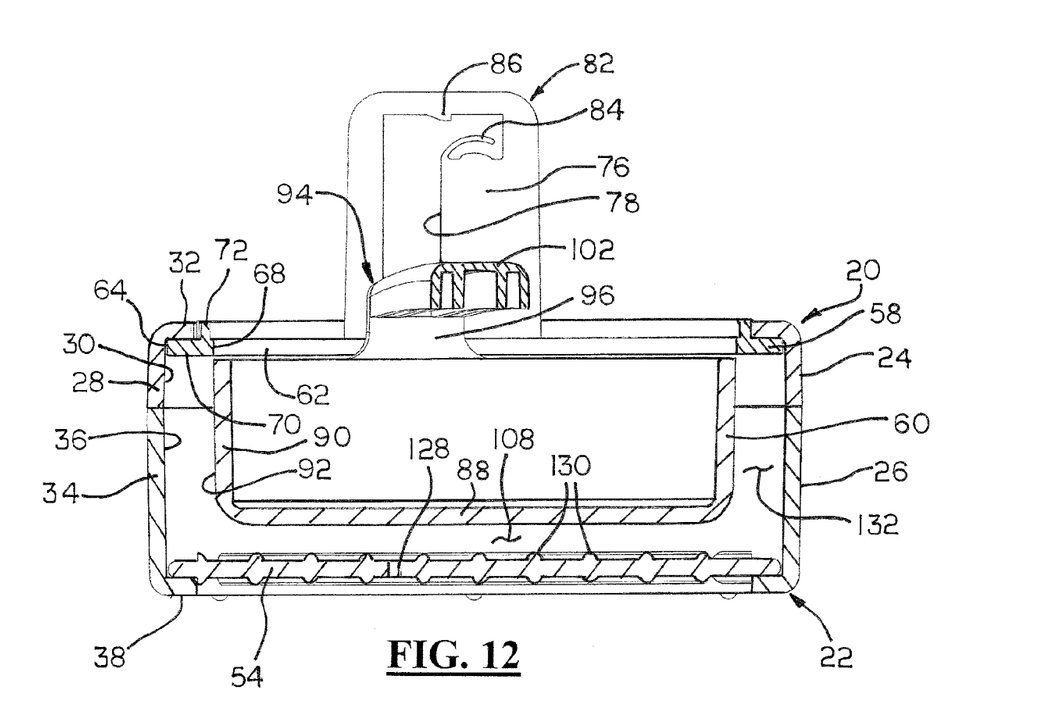
FIG. 12 illustrates a cross-sectional view of the forming device taken along line 12-12 of FIG. 7.

In a sixth position, referring to FIGS. 7 and 12, the second press mechanism 60 is lowered to become disposed proximate to the second end 22 of the shell 18, thereby causing compression of a central portion of the food article 12 within cavity 108. This central compression creates the cavity 14 of the food article 12 allowing for placement of food articles therein by depressing only the central portion of the food article 12 while the exterior portions maintain position or increase in height due to a gap 132 formed between the annular wall 90 of the second press mechanism 60 and the annular wall 34 of the second shell member 26.

After compression, resulting from the sixth position, the second press mechanism 60 is raised proximate to the first end of the shell 18 and back to the fifth position shown in FIGS. 6 and 11. The engagement members 80 and second press mechanism 60 is then rotated clockwise to reengage the engagement members 80 with the first press mechanism 58 thereby causing engagement of the first and second press mechanism 58, 60 and movement back to the first position shown in FIG. 3. The forming device 10 is then opened, i.e. the press assembly 56 and first shell member 24 are rotated, with respect to the second shell member 22, to place additional food articles within cavity 108.

In one embodiment, the cavity 14 formed in the food article 12 is filled with one or more additional food articles 16. Once all additional food articles 16 are placed within cavity 14, an additional food article 134, similar to that of food article 12 and having a diameter similar to the inner circumference 36 of the second shell member 26 is placed over the food article 12 and additional food article 16. The forming device 10 is then closed and the press assembly 56 is rotated back to the third position, shown in FIGS. 4 and 9. The press assembly 56, i.e. first and second press mechanisms 58, 60, are moved toward the second end of the shell 18 to compress the food articles 12, 16, 134 together. The press assembly is then moved back into the first position, shown in FIGS. 3 and 8, and the forming device is opened to remove the formed food article 136 for consumption or further processing, such as cooking, seasoning or otherwise. However, in one exemplary embodiment, the formed food article 136 may be cooked within the forming device 10.

Referring to FIGS. 13 and 14, an exemplary embodiment of a formed food article 136, according to the teachings of the present invention, is shown. As shown, the original food article 12 is placed within the cavity 108 of the second shell member 26 has combined with the additional food article 134 to form the resulting cavity 14 for receiving the additional food article 16. It should be appreciated that the resulting formed food article may comprise a unitary structure that is capable of being cooked or otherwise further processed without falling apart, due to the compression applied during the forming process.

The forming device 10 maybe formed of any suitable material capable of withstanding suitable forces for creating the formed food article 136. In one embodiment, the components of the forming device 10 are formed of a substantially similar material. In another embodiment, the forming device is formed of multiple materials, materials having added reinforcement, such as additional components, fillers or otherwise, for providing additional strength for materials undergoing greater forces. Accordingly, it is contemplated that the forming device may be formed of metal, plastic, ceramic, glass or otherwise. In one particular configuration, the forming device is formed of plastic, and more particularly of polypropylene copolymer. In another configuration, it is contemplated that the forming device 10 is formed of a material resistance to high temperatures such a stainless steel or otherwise for heating the formed food article 130 within the forming device 10. It should be appreciated that other materials are possible.

In one exemplary embodiment, it is contemplated that one or more, or even substantially all of the components forming the forming device 10 includes a non-stick surface or reduced stick layer for improving removal of the resulting formed food articles 136. An example of suitable non-stick or reduce stick material includes Teflon™, though others are possible.

It is further contemplated that forming device 10 may include one or more additional features, such as features for increasing rigidity of the forming device 10 during use. For example, in one configuration, it is contemplated that the forming device includes a reinforcement post extending between the handle 102 and the second press mechanism 60 for increasing compression capabilities during various stages of forming the formed food article 136. In another example, it is contemplated that the material thickness shown in the drawings may be increased or decreased according the strength requirements, weight, material cost or otherwise.

It should be appreciated that the forming device of the present invention may be used to form various food articles that may or may not need further processing such as cooking, seasoning or otherwise. Accordingly, it is contemplated that the food article 12 may comprise beef, pork, chicken, or other meat. It is further contemplated that the food article 12 may comprise non-meat products, such as tofu or otherwise. In either configuration, or otherwise, it should be appreciated that the resulting formed food article 130 may be further proceeded, cooked or otherwise, or may comprise a final product suitable for serving.

While the invention has been described with reference to a preferred embodiment it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A forming device for articles of food, the forming device comprising:
    a shell assembly extending between a first end and a second end, the shell assembly including:
        a first shell member disposed at the first end, the first shell member having an annular wall with an inner circumference,
        a second shell member disposed at the second end, the second shell member having an annular wall with an inner circumference,
        a base member disposed proximate the second end of the shell assembly; and
    a press assembly moveable between the first end and second end of the shell assembly, the press assembly including:
        a first press mechanism having an outer circumference and an inner circumference, the outer circumference of the first press mechanism corresponding generally to the inner circumference of the first or second shell member, the first press mechanism defining a slot extending generally perpendicular to the base member,
        a second press mechanism having an outer circumference generally corresponding to the inner circumference of the first press mechanism, the second press mechanism including a projection extending outwardly from the outer circumference,
        wherein the projection of the second press mechanism slidably engages the slot of the first press mechanism to guide movement of the second press mechanism with respect to the first press mechanism.

2. The device of claim 1, wherein the slot of the first press assembly includes a first portion extending generally perpendicular to the base member and a second portion extending generally parallel to the base member.

3. The device of claim 2, wherein in a first position the projection of the second press mechanism resides in the first portion of the slot and the second press mechanism is moveable with respect to the first press mechanism.

4. The device of claim 3, wherein in a second position the projection of the second press mechanism resides in the second portion of the slot and the second press mechanism is limited from moving with respect to the first press mechanism.

5. The device of claim 1, wherein the first press mechanism defines two slots extending generally perpendicular to the base member and the second press mechanism includes two projections extending outwardly from the outer circumference, the two projections of the second press mechanism slidably engaging the two slots of the first press mechanism to guide movement of the second press mechanism with respect to the first press mechanism.

6. The device of claim 5, wherein the two slots are disposed on opposite sides of the first press mechanism and the two projections are disposed on opposite sides of the second press mechanism.

7. The device of claim 6, wherein the second press mechanism includes a handle extending between the two projections.

8. The device of claim 1, wherein the first shell member includes an inwardly extending lip, the inwardly extending lip defining a slot for guiding movement of the first press mechanism and second press mechanism between the first end and second end of the shell assembly.

9. The device of claim 8, wherein the first press mechanism forms a groove engagable with the inwardly extending lip of the first shell.

10. The device of claim 8, wherein the first press mechanism includes a tab for preventing movement of the first press mechanism and second press mechanism between the first end and second end of the shell assembly.

11. The device of claim 1, wherein the base includes a plurality of openings for allowing airflow therethrough.

12. The forming device of claim 1, further comprising a hinge rotatably connecting the first shell member to the second shell member, the hinge being configured to allow the forming device to move between an open position and a closed position.

13. The forming device of claim 12, further comprising a latch for maintaining the forming device in the closed position.

14. A forming device for articles of food, the forming device comprising:
    a shell assembly extending between a first end and a second end, the shell assembly including:
        a first shell member disposed at the first end, the first shell member having an annular wall with an inner circumference, the first shell member further including an inwardly extending lip, the inwardly extending lip defining two oppositely disposed slots,
        a second shell member disposed at the second end, the second shell member having an annular wall with an inner circumference,
        a base member disposed proximate the second end of the shell assembly, and
        a hinge rotatably connecting the first shell member to the second shell member, the hinge being configured to allow the forming device to move between an open position and a closed position; and
    a press assembly moveable between the first end and second end of the shell assembly, the press assembly including:
        a first press mechanism having an outer circumference corresponding generally to the inner circumference of the first shell member and second shell member, the first press mechanism further having an inner circumference and a compression surface orientated towards the base of the shell assembly, the compression surface being formed between the outer circumference and the inner circumference, the first press mechanism including two engagement features, each of the two engagement features defining a slot extending perpendicular to the compression surface,
        a second press mechanism having an outer circumference generally corresponding to the inner circumference of the first press mechanism, the second press mechanism having a compression surface orientated towards the base member of the shell assembly and formed within the outer circumference of the second press mechanism, the second press mechanism including two projections extending into the slots the first press mechanism, wherein the slots of the two engagement features guide movement of the second press mechanism with respect to the first press mechanism, and wherein the two oppositely disposed slots formed by the inwardly extending lip of the first shell member is configured to guide movement of the first press mechanism and second press mechanism between the first end and the second end of the press assembly.

15. A forming device for articles of food, the forming device comprising:

a shell extending between a first end and a second end, the shell including a base member and an annular wall defining an inner circumference;

a press assembly moveable between the first end and second end of the shell, the press assembly including:

a first press mechanism having an outer circumference corresponding generally to the inner circumference of the shell and an inner circumference, the first press mechanism having a compression surface orientated towards the base of the shell and formed between the outer circumference and the inner circumference, the first press mechanism including two engagement features, each of the two engagement features defining a slot extending perpendicular to the compression surface, a second press mechanism having an outer circumference generally corresponding to the inner circumference of the first press mechanism, the second press mechanism having a compression surface orientated towards the base of the shell and formed within the outer circumference of the second press mechanism, the second press mechanism including two projections extending into the slots the first press mechanism, wherein the slots of the two engagement features guide movement of the second press mechanism with respect to the first press mechanism.

16. The device of claim 15, wherein the slots of the two engagement features include a first portion extending away from the compression surface of the second press mechanism and second portion extending generally parallel with respect to the compression surface of the second press mechanism.

17. The device of claim 16, wherein in a first position the projections of the second press mechanism resides in the first portion of the two slots and the second press mechanism is moveable with respect to the first press mechanism, and wherein in a second position the projections of the second press mechanism resides in the second portion of the two slots and the second press mechanism is limited from moving with respect to the first press mechanism.

18. The device of claim 17, wherein the two slots are disposed on opposite sides of the first press mechanism and the two projections are disposed on opposite sides of the second press mechanism.

19. The device of claim 15, wherein the shell includes an inwardly extending lip, the inwardly extending lip defining two oppositely disposed slots for guiding movement of the first press mechanism and second press mechanism between the first end and second end of the shell.

20. The device of claim 19, wherein the first press mechanism forms a groove engagable with the inwardly extending lip of the first shell.

* * * * *